May 6, 1969 W. CARLS 3,442,291
ROTARY VALVE CONSTRUCTION
Filed June 14, 1967 Sheet 1 of 3

INVENTOR
WILLIAM CARLS

BY Barnes, Kisselle, Raisch & Choate
ATTORNEYS

United States Patent Office 3,442,291
Patented May 6, 1969

1

3,442,291
ROTARY VALVE CONSTRUCTION
William Carls, Highland, Mich., assignor to Numatics, Incorporated, Highland, Mich., a corporation of Michigan
Filed June 14, 1967, Ser. No. 646,022
Int. Cl. F16k 3/26, 13/02
U.S. Cl. 137—625.41                                      6 Claims

ABSTRACT OF THE DISCLOSURE

A valve construction utilizing a rotary valve member which is adapted to operate as a servo control with selective operation in either direction and a valve spool construction with axial passages for pneumatic pressure distribution together with a side wall formation to achieve balancing at all times.

---

This invention relates to a rotary valve construction and more particularly to a valve which can be utilized for servo mechanisms and for fine and accurate control of moving parts.

It is an object of the invention to provide a valve which can operate more or less constantly in connection with control signals and which can handle high pressures without undue wear. With this in mind, the valve is so designed that pressure is equalized around its outer surface so that there is a radial and longitudinal balancing effect to prevent undue wear of a finely fitted rotary member within an operating sleeve.

The valve is also provided with axial passages for distribution of pneumatic pressure with suitable opertaing recesses to achieve radial balance at all times.

Other objects and features of the invention will be apparent in the following description and claims in which the principles of the invention and the operation are set forth together with the best mode contemplated for carrying out the invention.

Figure 1:
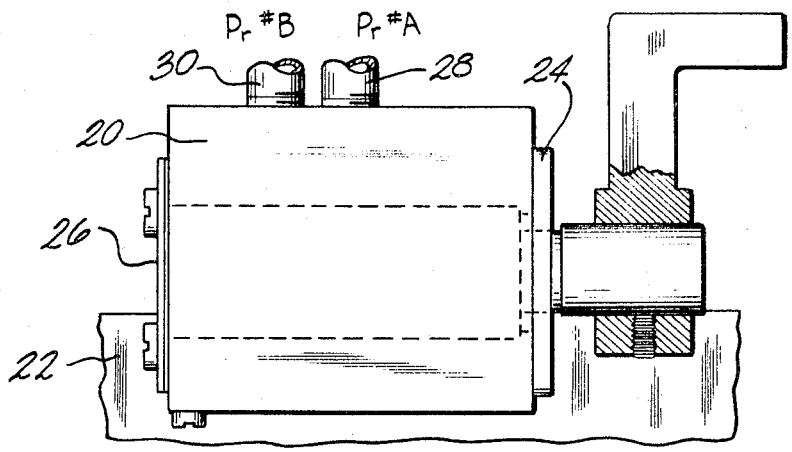

Drawings accompany the disclosure and the various views thereof may be briefly described as:

FIGURE 1, a side elevation of the valve as mounted for operation.

Figure 2:
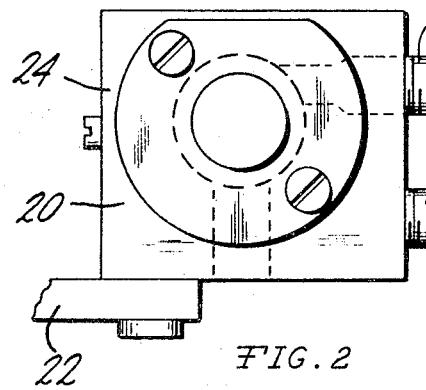

FIGURE 2, an end view from the right-hand end of the valve as shown in FIGURE 1.

Figure 3:
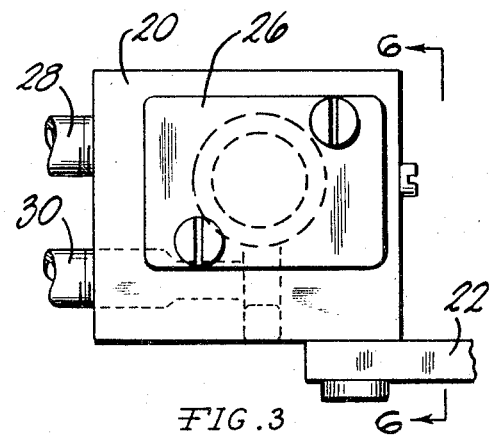

FIGURE 3, an end view from the left-hand end of the valve as shown in FIGURE 1.

Figure 4:
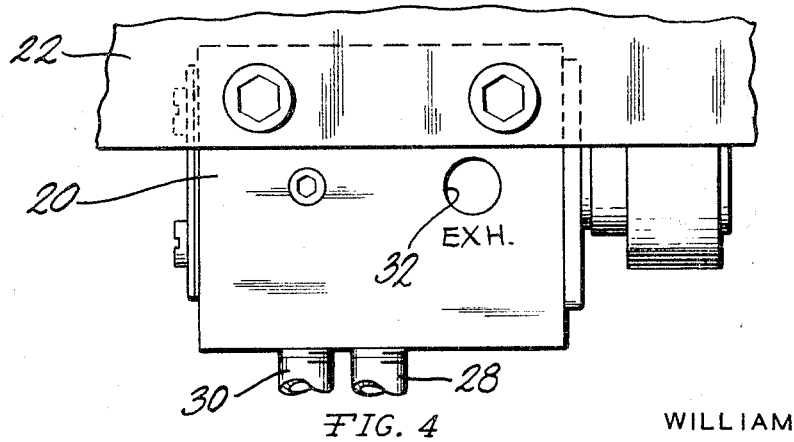

FIGURE 4, a bottom view of the valve.

Figure 5:
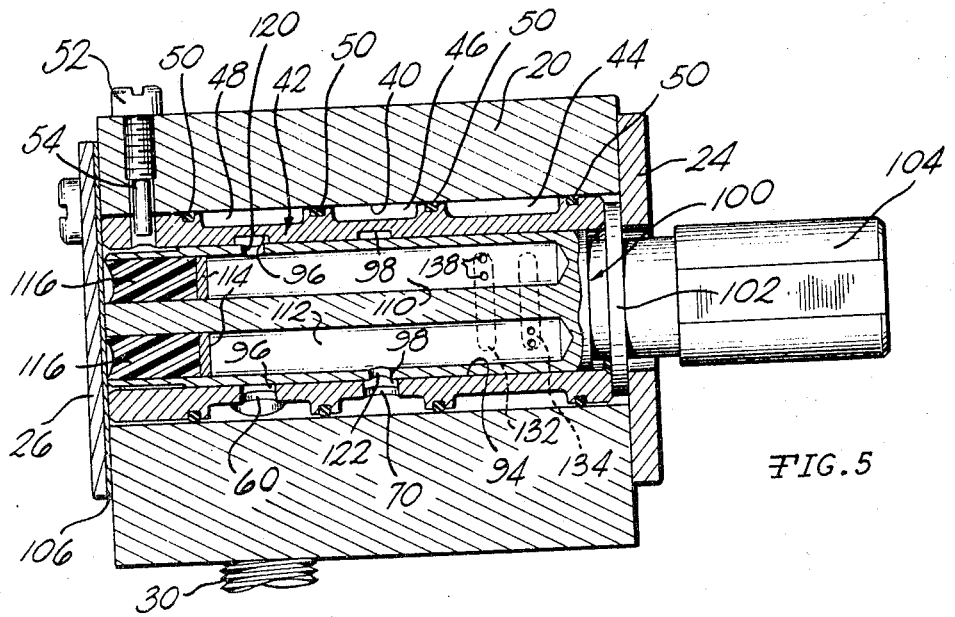
Figure 6:
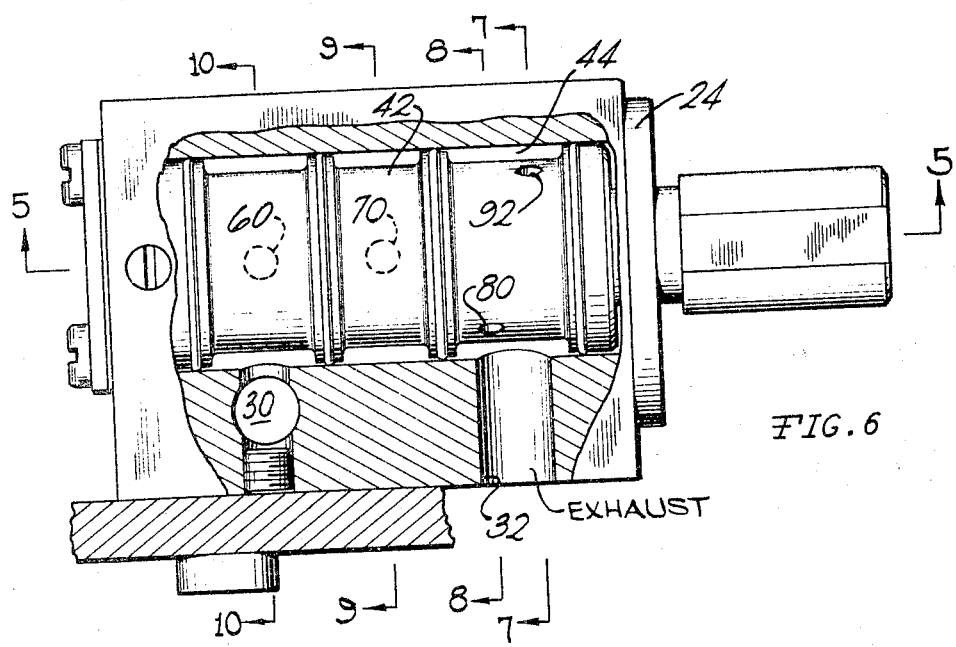

FIGURE 5 is a longitudinal sectional view of the valve on line 5—5 of FIGURE 6.

FIGURE 6, a side view on line 6—6 of FIGURE 3 with a portion of the outer housing broken away.

FIGURES 7, 8, 9, and 10, sectional views taken respectively on lines 7—7, 8—8, 9—9, and 10—10 of FIGURE 6.

Referring to the drawings, in FIGURE 1, a valve housing 20 mounted on a stationary base 22, the valve having end plates 24 and 26 for closing the housing in assembly as shown in FIGURE 5, these end plates being screwed on by suitable headed screws. The valve housing 20 has two pressure ports A and B at 28 and 30 respectively and an exhaust port 32 shown in FIGURES 4 and 6.

Referring to FIGURE 5, the interior of the valve is shown, the housing 20 having a bore 40 which receives a sleeve 42 having three annular recesses 44, 46 and 48 forming annular chambers with the interior of the bore 40. The sleeve 42 has an outer diameter which is substantially less than the inner diameter of the bore 40 and is accordingly mounted in spaced relation to the walls of the bore by O-rings 50, these O-rings serving to thermally and mechanically insulate the sleeve 42 from the

2 supporting housing. The sleeve 42 is fixed circumferentially in the housing by a screw 52 having a pin 54 at one end to enter a radial hole in the sleeve. There are certain ports in the walls of the sleeve 42. Specifically, at the left-hand end is shown a port 60 connected to the annular recess 48. Centrally of the sleeve is a port 70 connected with the annular recess 46. At the right-hand end of the sleeve are two pairs of ports spaced 180° circumferentially and also spaced longitudinally. These ports cooperate with annular recesses 44 and are shown as ports 80–82 and 90–92 in FIGURES 8 and 7 respectively.

The sleeve 42 has a finely finished bore 94 and also two annular undercut grooves 96 and 98 just inside the ports 60 and 70 respectively. Mounted within the bore 94 of sleeve 42 is a rotary valve member 100 having a fine outside finish with a fine fit within the sleeve such that the valve member 100 can be rotated to various control positions. This valve has an integral collar member 102 positioned inside a control shaft 104 which projects from the assembly.

The collar bears against the end of the sleeve 42 and the assembly is held in place at the right-hand end, as shown in FIGURE 5, by the plate 24. At the other end of the valve housing 20, the plate 26 with a suitable gasket 106 seals the end of the bore 40.

Figure 7:
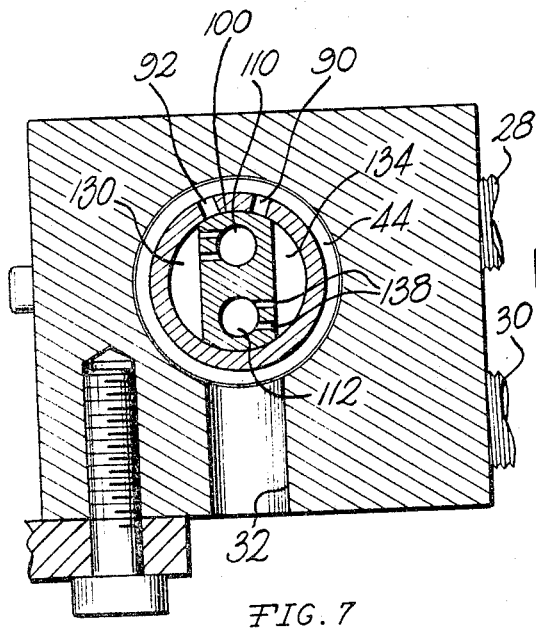
Figure 8:
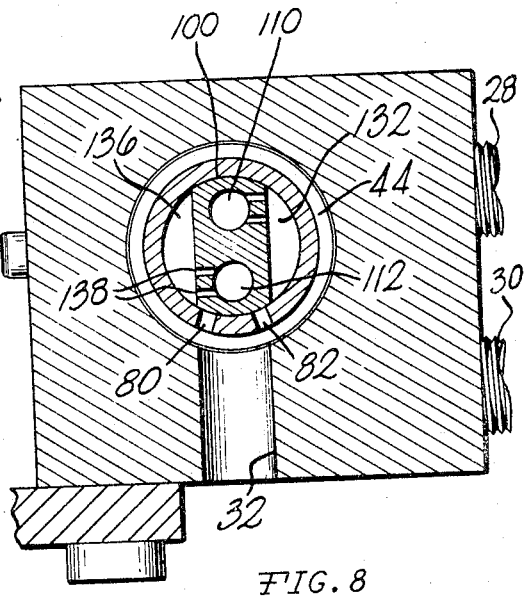
Figure 9:
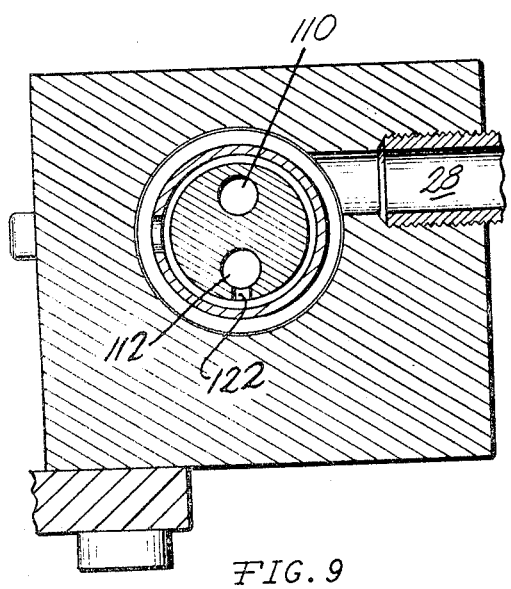
Figure 10:
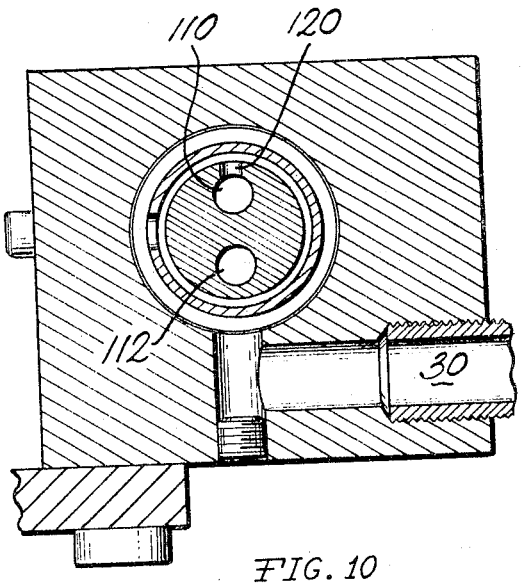

It will be seen from FIGURE 5 that the cylindrical portion of the control valve 100, rotated from the position in FIGURE 6 to illustrate the ports, has two axial passages 110 and 112, these being blind holes which are blocked at the open end with a suitable washer 114 and a plug 116. Passage 110 is connected to the annular undercut recess 96 by a port 120. Passage 112 is connected to the annular recess 98 through a wall port 122. At the right-hand end of the valve as shown in FIGURE 5, there are two pairs of chordal slots spaced 180° circumferentially, each slot of each pair being spaced longitudinally. These slots are shown in FIGURES 7 and 8 respectively. As shown in FIGURES 7 and 8, chordal slots 130 and 132 on opposite sides of the valve and spaced longitudinally connect with an axial passage 110. The other slots of each pair, 134 and 136, connect with an axial passage 112. Small cross bores 138 connect the respective slots to the respective axial passages.

In the operation of the device, it will be assumed that pressure is at ports 28 and 30, that is, pressure ports A and B shown in FIGURE 1, so that there is pressure in annular passages 46 and 48 and by reason of ports 120 and 122, there is pressure in the axial passages 110 and 112 leading up to the cross passages 138 which lead to the chordal slots. With the valve shown in the position of FIGURES 7 and 8, the ports 80–82 and 90–92 in the sleeve 42 are blocked by the periphery of the valve between the chordal slots. However, a slight rotation of the valve in a clockwise direction as shown in FIGURE 7 will connect the port 92 to the passage 110 through slot 130, and air can bleed then from the passage 110 to the exhaust port 32 through the annular chamber 44. At the same time the port 82 is opened through slot 132 to passage 110, thus connecting passage 110 to the annular passage 44. Thus, pressure escaping in clockwise rotation of the valve will be exerted on each side of the valve and there will be no pneumatic unbalance either radially or longitudinally.

Similarly, when the valve 100 is rotated in a counterclockwise direction, the chordal slot 134 will connect passage 112 to port 90 and the chordal slot 136 will connect passage 112 to port 80, thus, again exhausting to the exhaust port 32. Here again, it will be seen that a balanced condition holds in each case. The device can be used in a servo mechanism wherein any slight rotation of the valve in one direction or the other will cause a compensation to effect the necessary control and bring the valve back to what might be termed "dead center" in a servo relationship (not shown) where there is no exhausting from either port 28 or port 30 through the axial passages 110 and 112.

It will be seen that the fit of the valve spool 100 with the interior of the sleeve 42 should be such as to prevent leakage around the valve surface.

What is claimed as new is as follows:

1. A rotary valve assembly for control of pneumatic pressures which comprises:
    (a) a valve housing having a bore,
    (b) a sleeve in said bore having a control recess formed between the sleeve and the housing,
    (c) axially and circumferentially spaced ports formed in the wall of said sleeve connecting the interior of the sleeve and said recess, and
    (d) a rotary valve member in said sleeve having a pair of axially spaced chordal slots on opposite sides of the member to register in a position of rotation respectively, with said ports, each slot of each pair being connected to a separate axial passage in said member, wherein pressure controlled in either of said axial passages by said member will be exerted on each side of said member to balance side forces thereon.

2. A rotary valve as defined in claim 1 in which the slots of said member and the ports of said sleeve are so spaced circumferentially that the valve member in one position blocks said ports, and opens said ports selectively to one of said passages upon slight rotation in a selected direction.

3. A valve assembly for control of pneumatic pressures which comprises:
    (a) a housing having a bore and three ports entering said bore at spaced areas lengthwise along said bore,
    (b) a sleeve positioned in such housing bore forming with said bore a plurality of first annular chambers between said housing and sleeve, each chamber connecting to one of said ports and to the interior of said sleeve, and
    (c) a valve member rotatable within said sleeve forming, with said sleeve, longitudinally spaced second annular chambers respectively open to two of said first annular chambers, said valve member having spaced passages extending longitudinally of the member, each opening to the surface of the member at spaced axial positions to communicate respectively with said second annular chambers, the last of said first annular chambers being connectible to one or the other of said passages selectively by surface passages in said member movable to a connecting position by rotation of said member.

4. A valve assembly as defined in claim 3 in which the surface passages of said valve member in the area of said last of said first annular chambers are formed as spaced chordal slots on each side of the member, one slot on each side being connected to one of said passages.

5. A valve assembly as defined in claim 3 in which the valve member has, at said last of said first annular chambers, surface openings on opposite sides of the valve member to connect said last of said first annular chambers selectively to one of said passages depending on the direction of rotation of said member.

6. A valve assembly as defined in claim 3 in which the valve member has surfaces to close the said last of said first annular chambers from the interior of said sleeve, and has surface openings to open said last of said first annular chambers to one of said passages selectively upon rotation in a predetermined direction of said member.

References Cited

UNITED STATES PATENTS

| 1,796,808 | 3/1931 | Roberts | 251—283 |
| 2,547,929 | 4/1951 | Dawson | 137—625.23 |
| 2,880,756 | 4/1959 | Puls | 137—625.23 |
| 2,907,349 | 10/1959 | White | 137—625.23 |
| 3,199,539 | 8/1965 | Leathem | 137—625.24 |

HENRY T. KLINKSIEK, *Primary Examiner.*

U.S. Cl. X.R.

251—283